United States Patent [19]

Gulick

[11] Patent Number: 5,778,218

[45] Date of Patent: Jul. 7, 1998

[54] METHOD AND APPARATUS FOR CLOCK SYNCHRONIZATION ACROSS AN ISOCHRONOUS BUS BY ADJUSTMENT OF FRAME CLOCK RATES

[75] Inventor: Dale E. Gulick, Austin, Tex.

[73] Assignee: Advanced Micro Devices, Inc., Sunnyvale, Calif.

[21] Appl. No.: 770,016

[22] Filed: Dec. 19, 1996

[51] Int. Cl.$^6$ .................................................. G06F 1/12
[52] U.S. Cl. .......................... 395/558; 395/551; 395/880
[58] Field of Search ............................ 395/555, 558, 395/872, 877, 878, 880, 551; 375/354

[56] References Cited

U.S. PATENT DOCUMENTS

| | | | |
|---|---|---|---|
| 4,378,588 | 3/1983 | Katzman et al. | 395/877 |
| 5,025,457 | 6/1991 | Ahmed | 375/354 |
| 5,204,882 | 4/1993 | Chao et al. | 375/354 |
| 5,249,271 | 9/1993 | Hopkinson et al. | 395/877 |

OTHER PUBLICATIONS

Universal Serial Bus Specification, Compaq et al., Revision 0.9, Mar. 31, 1995, pp. 1–120.

*Primary Examiner*—Thomas M. Heckler
*Attorney, Agent, or Firm*—Conley, Rose & Tayon; B. Noel Kivlin

[57] ABSTRACT

A mechanism for adjusting the frame clock used by an audio DSP or other functional unit to transfer data to the rate at which data is transferred across an isochronous bus. According to one embodiment of the present invention, there is provided a mechanism for monitoring the level of data in a data buffer. The data are transferred to the buffer from the audio DSP, and then out the buffer across the isochronous bus, such as a Universal Serial bus. If the level in the buffer is too high, the audio DSP is filling the data buffer too quickly. If the data level in the buffer is too low, then the audio DSP is not providing the data quickly enough. The frame clock on the audio logic which is used to generate and transfer the data to the buffer is adjusted. Thus, if the level in the buffer is too high, the frame clock will be slowed; if the level in the buffer is too low, the rate of the frame clock will be increased. More particularly, there is provided a programmable clock divider which receives as input a master clock used by the audio DSP for computational purposes, and from which the frame clock is derived. Responsive to the level of data in the buffer, the programmable clock divider will adjust the rate of the frame clock.

20 Claims, 6 Drawing Sheets

METHOD AND APPARATUS FOR CLOCK SYNCHRONIZATION ACROSS AN ISOCHRONOUS BUS BY ADJUSTMENT OF FRAME CLOCK RATES

FIELD OF THE INVENTION

The present invention relates to clocking peripheral devices for computers and particularly to synchronizing clocks in a computer system including an isochronous bus by adjusting a frame clock rate.

DESCRIPTION OF THE RELATED ART

The Universal Serial Bus (USB) specification is a proposed standard for an isochronous bus recently promulgated by a group of computer companies including Compaq Computer Corporation, Digital Equipment Corporation, IBM Corporation, Intel Corporation, Microsoft Corporation and Northern Telecom. Described below are various aspects of the Universal Serial Bus. Further background concerning the Universal Serial Bus may be obtained from the Universal Serial Bus Specification, which is hereby incorporated by reference.

The Universal Serial Bus is intended as a bi-directional, isochronous, low-cost, dynamically attachable, serial interface to promote easy PC peripheral expansion and provide full support for real-time voice, audio, and compressed video data. The Universal Serial Bus provides two-wire point-to-point signaling in which the signals are differentially driven at a bit rate of 12 megabits per second. The Universal Serial Bus includes support for both isochronous and asynchronous messaging at the 12 megabit per second data speed.

The Universal Serial Bus specification defines a Universal Serial Bus system in terms of Universal Serial Bus "interconnects", "devices", and "hosts". A Universal Serial Bus interconnect defines the manner in which devices are connected to and communicate with the host, including bus topology, data flow models, scheduling, and interlayer relationships. In any given Universal Serial Bus topology, there is only one host.

Universal Serial Bus devices include hubs and functions. Hubs provide additional attachment points to the Universal Serial Bus and may be integrated with a host, which ordinarily provides only one attachment point for connecting a hub or a function. Functions provide capabilities to the system, such as joystick, keyboard, microphone, and speaker capabilities.

The basic data transfer protocol of the Universal Serial Bus is described as follows, with particular attention to FIG. 1. FIG. 1 is a diagram of the basic packet transfer 1000 of the Universal Serial Bus. The basic transfer 1000 includes a token packet 1002, a data packet 1004, and a handshake packet 1006. Each packet is preceded by a synchronization field SYNC which is used by input circuitry to align incoming data with the local clock. It is defined to be 8 bits in length and is stripped out by the connector interface.

Following the SYNC field in each packet is a packet identifier (PID(T) for the token packet, PID(D) for the data packet, PID(H) for the handshake packet, and PID(S) for the start-of-frame packet, which may be considered a type of token packet). The packet identifiers PID(T), PID(D), PID (H) and PID(S) include a 4-bit identification field and a 4-bit check field used to identify the format of the packet and type. There are two types of token 1002 packet ID fields PID(T). These denote (i) a data transfer from the function to the host; and (ii) a data transfer from the host to the function. In addition to the packet ID, PID(T), the token packet includes an 8-bit address field ADDR and a 3-bit end point field, ENDP. The address field ADDR of the token packet specifies the function that it is to receive or send the data packet. The end-point field ENDP permits addressing of more than one subchannel of an individual function.

Only one type of start-of-frame packet identification field 1008, PID(S), is defined: a start of frame time stamp. The address and endpoint fields of the token packet are replaced in the start of frame packet with a time-stamp field. The time-stamp field for the start of frame packet provides a clock tick which is available to all devices on the bus. The start-of-frame packet is sent by the host every 1 ms±0.01%. In addition, for both the token and start-of-frame packets, a 5-bit cyclical redundancy checksum (CRC) field is provided.

The data packet 1004 includes a packet identifier PID(D), a data field DATA, and a 16-bit cyclical redundancy checksum field, CRC16. Two types of packet IDs for the data field, data 0 and data 1, identify whether the data packet is being sent for the first time or whether being sent as a retry. The data field DATA may vary in length from 0 to N bytes. Failure of the cyclical redundancy checksum on the data field DATA causes the receiver to issue an error ERR handshake.

The handshake packet 1006 includes only a packet identifier PID(H), of which there are four types. An acknowledge handshake, ACK, indicates that the receiver will accept the data and that the CRC has succeeded. A negative acknowledge, NACK, indicates that the receiver cannot accept the data or that the source cannot send the data. An ERR field indicates that the receiver will accept the data, but that the CRC has failed. A stall handshake packet, STALL, indicates that the transmission or reception pipe is stalled. A stall handshake is defined only for stream-oriented endpoints (as distinguished from message-oriented endpoints, discussed below).

Data flow on the Universal Serial Bus is defined in terms of "pipes." A pipe is a connection between a host and an endpoint. The Universal Serial Bus defines "stream" and "message" pipes. For a stream pipe, data is delivered in prenegotiated packet sizes. Data flows in at one end of the stream pipe and out the other end in the same order. Stream mode thus includes flow control and employs no defined USB structure. For a message pipe, however, a request is first sent to the device which is followed at some later time by a response from the end-point. Message pipes thus impose a structure on the data flow, which allows commands to be communicated. These commands can include bandwidth allocation.

The Universal Serial Bus supports isochronous, asynchronous, and asynchronous interactive data flow. For isochronous data, access to USB bandwidth is guaranteed. A constant data rate through the pipe is provided, and in the case of delivery failure due to error, there is no attempt to retry to deliver the data. Asynchronous interactive data flow provides a guaranteed service rate for the pipe, and the retry of failed transfer attempts. Asynchronous data flow accommodates access to the USB on a band-width available basis and also permits retry of data transfers.

Scheduling of the Universal Serial Bus is defined in terms of "slots", "frames" and "super frames", as illustrated in FIG. 2, which shows an exemplary USB schedule 1100. Frames 1104b and 1104a begin with a start of frame packet, 1108a and 1108b, respectively. Each frame has a duration of time equal to about 1 ms. Each frame, 1104a, 1104b is subdivided into one or more slots, 1102a, 1102b, for example. Each slot corresponds to some USB transaction, e.g., 1110a, 1110b, 1110c, 1110d. Each slot is large enough to contain the worst case transmission time of the transaction to which it corresponds, and includes the effects of bit-stuffing, propagation delay through cables and hubs, response delays, and clocking differences between the host and the end-point. A super frame 1106 consists of a repeatable sequence of individual frames, and is the largest schedulable portion of time permitted.

The Universal Serial Bus provides both periodic service and aperiodic service. For periodic service corresponding to isochronous data, a fixed period exists between the delivery of start of frame packets to a specific end-point. However, aperiodic service is characterized by a varying period between delivery of start of frame tokens for a given end-point. Periodic service is given a higher priority in scheduling than aperiodic service.

Turning now to FIG. 3, there is illustrated an abstracted block diagram of a Universal Serial Bus device, such as a hub or function. Universal Serial Bus device 1200 includes a device interface 1202 and a class interface 1204. Device interface 1202 includes device information and control block 1206, which is required for the USB device to attach to the USB and is independent of the functionality provided by the device. The device interface further includes serial bus interface engine 1210, which provide for management of the bus interface, including performing acknowledgments and recognizing packets that are addressed to the USB device. In addition, the interface engine 1210 provides for stripping the SYNC field from incoming packets. The class interface 1204 includes class information and control block 1214 which depends upon the functionality of the device (for example, hubs and locators). Class interface 1204 further includes function engine 1216 which relates to the functionality implemented by the device. A USB device further includes logical buffers, such as packet buffer 1208 and elasticity buffer 1212. The packet buffer defines the maximum packet size which the USB device can receive or send. The elasticity buffer relates to how flexible the scheduled generator may be in allocating band-width for the associated end-point and determines the maximum amount of data the device end-point can handle. The various functional blocks of the USB device are not shown connected to one another in FIG. 3 because, as discussed in the USB specification, the relationship between the components may be implementation-dependent. In addition, a Universal Serial Bus device may include storage space, local to the USB device, though addressable by the host; and vendor space, which may be defined by the vendor of the device.

While the Universal Serial Bus is intended to be an industry-wide standard peripheral interface, the Universal Serial Bus Specification does not define the relationship between components in Universal Serial Bus devices or in computer systems employing the Universal Serial Bus. Typically, a Universal Serial Bus host controller will be incorporated into a bus bridge which also may include a cache controller and a memory controller. The bus bridge may couple one or more audio logic units to a processor by way of an expansion bus, such as a Peripheral Component Interconnect bus. A system memory and a Universal Serial Bus device, such as a powered loudspeaker, may further be coupled to the bus bridge. Such a computer system typically employs a plurality of clock circuits: a first clock is the system clock, used by the processor and to generate the 1 millisecond frames used by the USB clock. The USB transfers the audio data from a buffer in memory (typically system memory) to the USB device. A second clock is used by an audio DSP in the audio logic to generate the audio data stream, typically in 44.1 kHz frames. Finally, a third clock is used by a digital-to-analog converter, for example, in the USB device to generate an audio output from the received USB data stream.

Each of the three clocks is independent of the others and has a slightly different 44.1 kHz clock rate. Accordingly, there is a need to provide a mechanism for synchronizing the three clocks in the system. It is to be noted that the PC-generated one millisecond Universal Serial Bus frame clock is generally fixed since there may be multiple USB peripherals with different clocks that must be matched. The Universal Serial Bus peripheral device digital-to-analog converter clock can be matched to the one millisecond frame clock in either of two ways. First, a phase locked loop (PLL) may be used to adjust the digital-to-analog converter's clock. This, however, provides a relatively complex digital-to-analog converter. Accordingly, it is preferable to adjust the number of samples per USB frame sent from the PC.

However, if the number of samples per USB frame is adjusted, the rate at which data is removed from the system memory buffer will vary relative to the audio DSP's clock. There is therefore a need to provide a way to adjust the frame clock used by the audio DSP.

SUMMARY OF THE INVENTION

Accordingly, there is provided a mechanism for adjusting the frame clock used by an audio DSP to transfer data to the rate at which data is transferred across an isochronous bus and, particularly, a Universal Serial Bus. According to one embodiment of the present invention, there is provided a mechanism for monitoring the level of data in a data buffer. The data are transferred to the buffer from the audio DSP, and then out the buffer across the Universal Serial bus. If the level in the buffer is too high, the audio DSP is filling the data buffer too quickly. If the data level in the buffer is too low, then the audio DSP is not providing the data quickly enough. The frame clock on the audio logic which is used to generate and transfer the data to the buffer is adjusted. Thus, if the level in the buffer is too high, the frame clock will be slowed; if the level in the buffer is too low, the rate of the frame clock will be increased. More particularly, there is provided a programmable clock divider which receives as input a master clock used by the audio DSP for computational purposes, and from which the frame clock is derived. Responsive to the level of data in the buffer, the programmable clock divider will adjust the rate of the frame clock.

According to one embodiment, an audio data buffer is configured to receive audio data from an audio peripheral. The audio data are generated at a first clock rate. The first clock is generated by dividing down the peripheral's computational clock. The data are removed from the buffer at a second predetermined clock, approximately equal to the first clock. A clock controller is provided to monitor the level of data in the buffer. The buffer comprises a dual port first in/first out (FIFO) random access memory (RAM) having a plurality of control flags, including a threshold or half full flag. The clock controller detects the assertion of the half full flag and causes a processor to issue commands to adjust the frame clock.

According to another embodiment, an audio data buffer is configured to receive audio data from an audio peripheral. The audio data are generated at a first clock rate. The first clock is generated by dividing down the peripheral's computational clock. The data are removed from the buffer at a second predetermined clock, approximately equal to the first clock. Software associated with a central processing unit monitors the level of data in the buffer. The buffer comprises a portion of main memory arranged in FIFO fashion. Software monitors the level of data and adjusts a programmable divider to adjust the frame clock.

Broadly speaking, a computer system according to one embodiment of the present invention comprises a central processing unit (CPU) and a data buffer operably coupled to the CPU. The CPU is configured to read data from the data buffer at a first predetermined clock rate. A clock controller is coupled to the data buffer and is configured to monitor levels of data in the data buffer, and to provide a signal indicative of the levels of data to the CPU.

A peripheral device is operably coupled to the data buffer and includes a data generating unit configured to generate data and write data to the data buffer at a second predetermined clock rate. The peripheral device further includes a master clock coupled to the data generating unit and configured to provide a computational clock for the data generating unit, and a programmable clock divider coupled to the master clock. The second predetermined clock rate is generated by programming a value into the programmable clock divider and dividing the master clock by the value. The value is programmed by the CPU responsive to the clock controller determining that the levels of data in the data buffer cross a predetermined threshold, such that the second predetermined clock rate approximates the first predetermined clock rate.

BRIEF DESCRIPTION OF THE DRAWINGS

A better understanding of the present invention can be obtained when the following detailed description of the preferred embodiment is considered in conjunction with the following drawings, in which.

Figure 1:
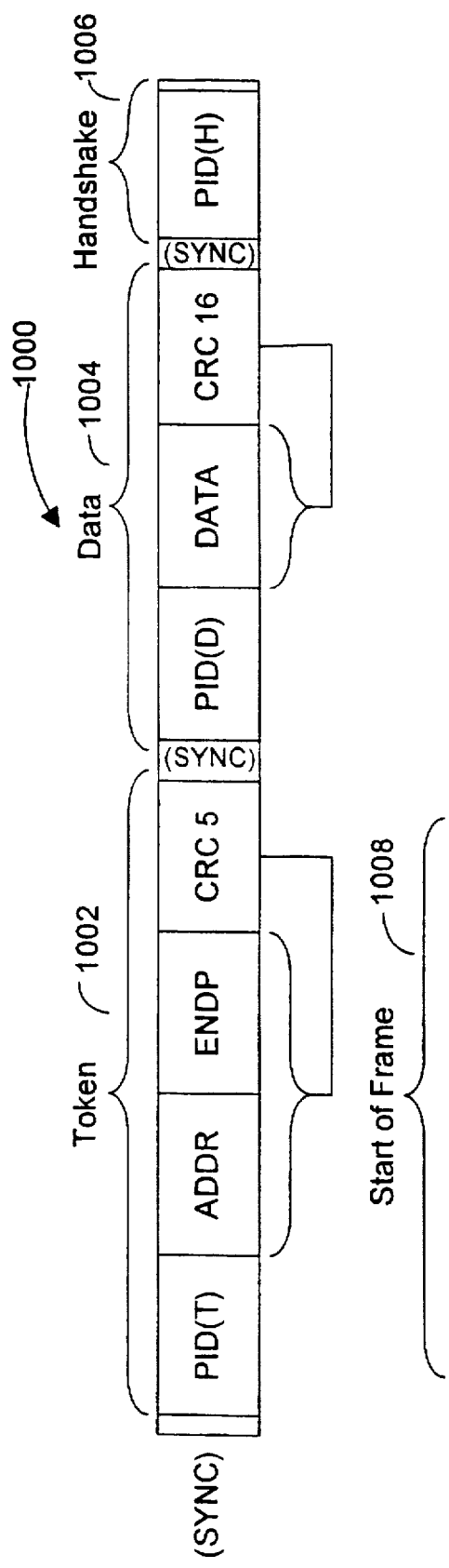
FIG. 1 is a representation of a data packet transfer along with a Universal Serial Bus.
Figure 2:
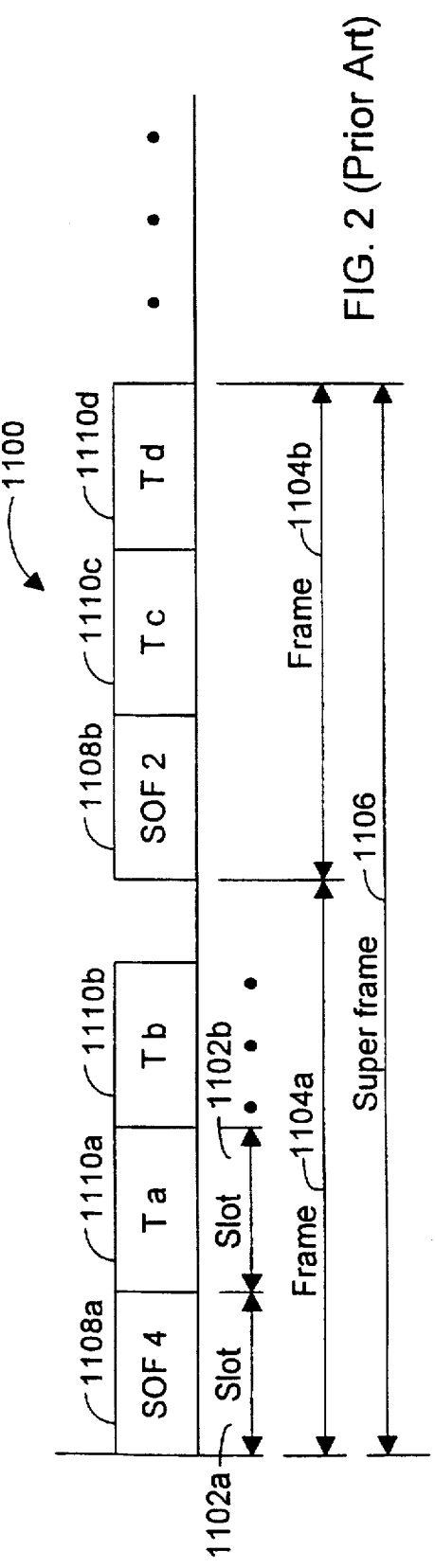
FIG. 2 is a representation of a scheduling paradigm for the Universal Serial Bus.
Figure 3:
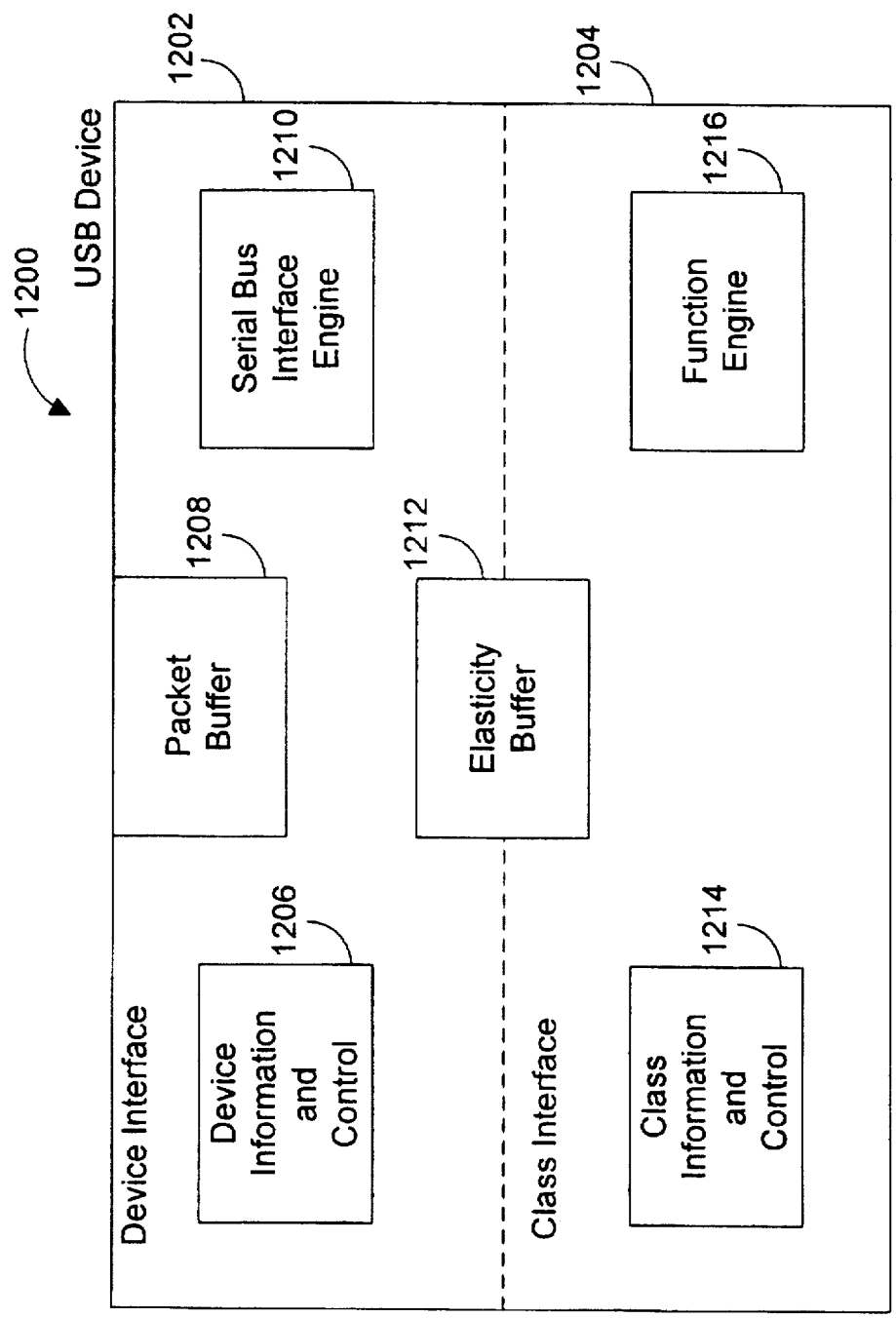
FIG. 3 is a block diagram of an exemplary Universal Serial Bus device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
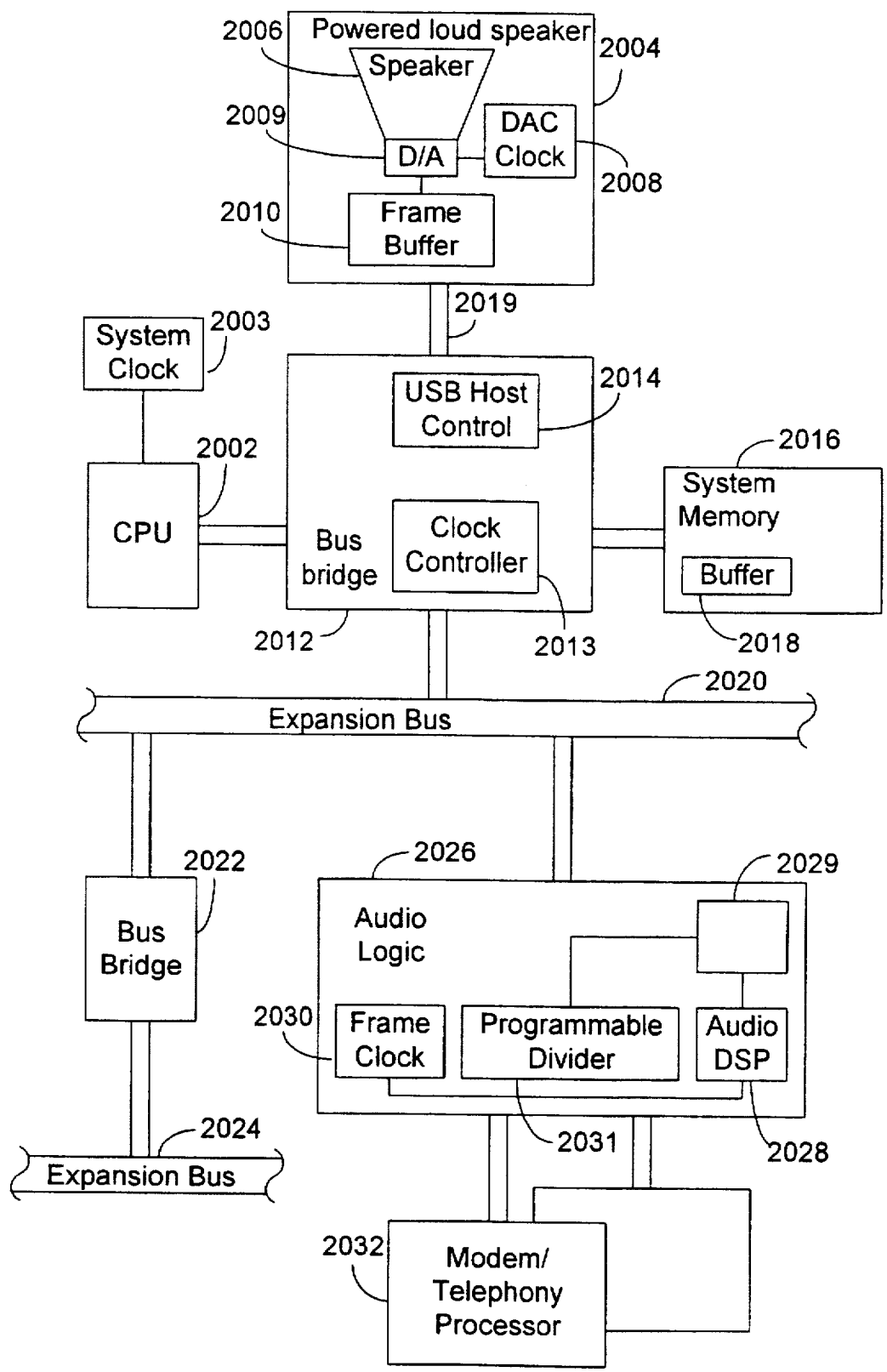
FIG. 4 is a block diagram of a computer system with a Universal Serial Bus device.

FIG. 4—Exemplary Computer System Having Clock Synchronization

Turning now to FIG. 4, a computer system 2000 includes a central processing unit (CPU) 2002 being clocked by a system clock 2003. CPU 2002 may be any of a variety of processors, including those implementing x86, Pentium, or PowerPC instruction sets. CPU 2002 is coupled to a bus bridge 2012 which includes a memory controller (not shown) and a Universal Serial Bus (USB) host control 2014. It is noted that while described in the context of a Universal Serial Bus, any of a variety of isochronous buses may be employed. Bus bridge 2012 may further include a clock controller 2013 whose function will be discussed in more detail below. Bus bridge 2012 is further coupled to system memory 2016, which can include a predetermined portion set aside as audio data buffer 2018. System memory 2016 preferably includes one or more random access memory (RAM) arrays. Audio data buffer 2018 may comprise one or more dual port first-in/first-out (FIFO) RAM arrays, or merely a predetermined portion of main memory, as will be discussed in greater detail below. Bus bridge 2012 is further coupled to a Universal Serial Bus device 2004 via a Universal Serial Bus 2019. Universal Serial Bus device 2004 may be a powered loudspeaker, a microphone system, or any of a variety of audio and/or video peripherals. Thus, Universal Serial Bus device 2004, as illustrated, is exemplary only.

As illustrated, Universal Serial Bus device 2004 includes a frame buffer 2010 for receiving data across the Universal Serial Bus 2019 from the USB host control 2014, a speaker 2006, a digital-to-analog converter (DAC) 2009, and a DAC clock 2008. The DAC 2009 within powered loudspeaker 2006 consumes or processes data from frame buffer 2010 based on DAC clock 2008, which typically clocks at 44.1 kHz (It is noted that this sampling rate is exemplary only, and that any sampling rate above the Nyquist rate may be employed). Bus bridge 2012 is coupled to expansion bus 2020. Expansion bus 2020 may be any of a variety of types of expansion buses, including a Peripheral Component Interconnect (PCI) bus, an Industry Standard Architecture (ISA) bus, an Extended Industry Standard Architecture (EISA) bus, or a Microchannel Architecture (MCA) bus. Expansion bus 2020 is coupled to a further bus bridge 2022 coupling to another expansion bus 2024 to which a plurality of peripheral devices (not shown) may be coupled.

In the exemplary computer system shown, audio logic 2026 is coupled to expansion bus 2020. Audio logic or peripheral device 2026 includes an audio digital signal processor (DSP) or data generating unit 2028 which is clocked by a DSP master clock 2029. It is noted that while a digital signal processor is illustrated, any device for processing and/or generating data could be employed. Audio logic 2026 further includes a frame clock 2030, which generates audio data at a 44.1 kHz frame rate (again, any sampling rate above the audio Nyquist rate may be employed) derived from dividing down the master clock. The 44.1 kHz frame rate is adjustable by a programmable divider 2031 (i.e., the number of master clock cycles per frame is adjustable). As will be discussed in more detail below, depending on the level of data in the audio data buffer 2018, clock controller 2013 provides a signal indicating whether the level of data is above or below a predetermined threshold, i.e., too low or too high, which causes the CPU 2002 to adjust the amount by which the DSP master clock is divided in order to generate the 44.1 kHz frame reference clock 2030, thereby adjusting the frame reference clock itself. Audio logic 2026 may also be coupled to one or more modem/telephony processors 2032. Alternatively, software running on the CPU may itself monitor the data levels.

Computer system 2000 operates as follows: Audio DSP 2028 on audio logic 2026 generates audio data at a 44.1 kHz sample rate. The sample rate is based on frame clock 2030 which is itself generated by inputting an audio logic master clock 2029 into a programmable divider 2031. The audio data is routed to an audio data buffer 2018 comprised in system memory 2016. A clock controller 2013 or software monitors the level of data in the buffer. If the level of data is too high, or exceeds a predetermined threshold, the clock controller 2013 transmits a signal to the CPU 2002, which in turn adjusts the audio frame clock downward by controlling the programmable divider. Alternatively, the software itself determines when the level of data is too high. The CPU adjusts the frame clock upward if the level of data in the buffer is too low.

The USB host control 2014 reads or removes the data from buffer 2018 and transfers it over Universal Serial Bus 2019 in the one millisecond frames discussed above, based on the PC's clock 2003. The audio data is then buffered in peripheral device frame buffer 2010. Playback digital-to-analog converter 2009 consumes the data from the frame buffer 2010 based on its own DAC clock 2008 at 44.1 kHz.

Figure 5:
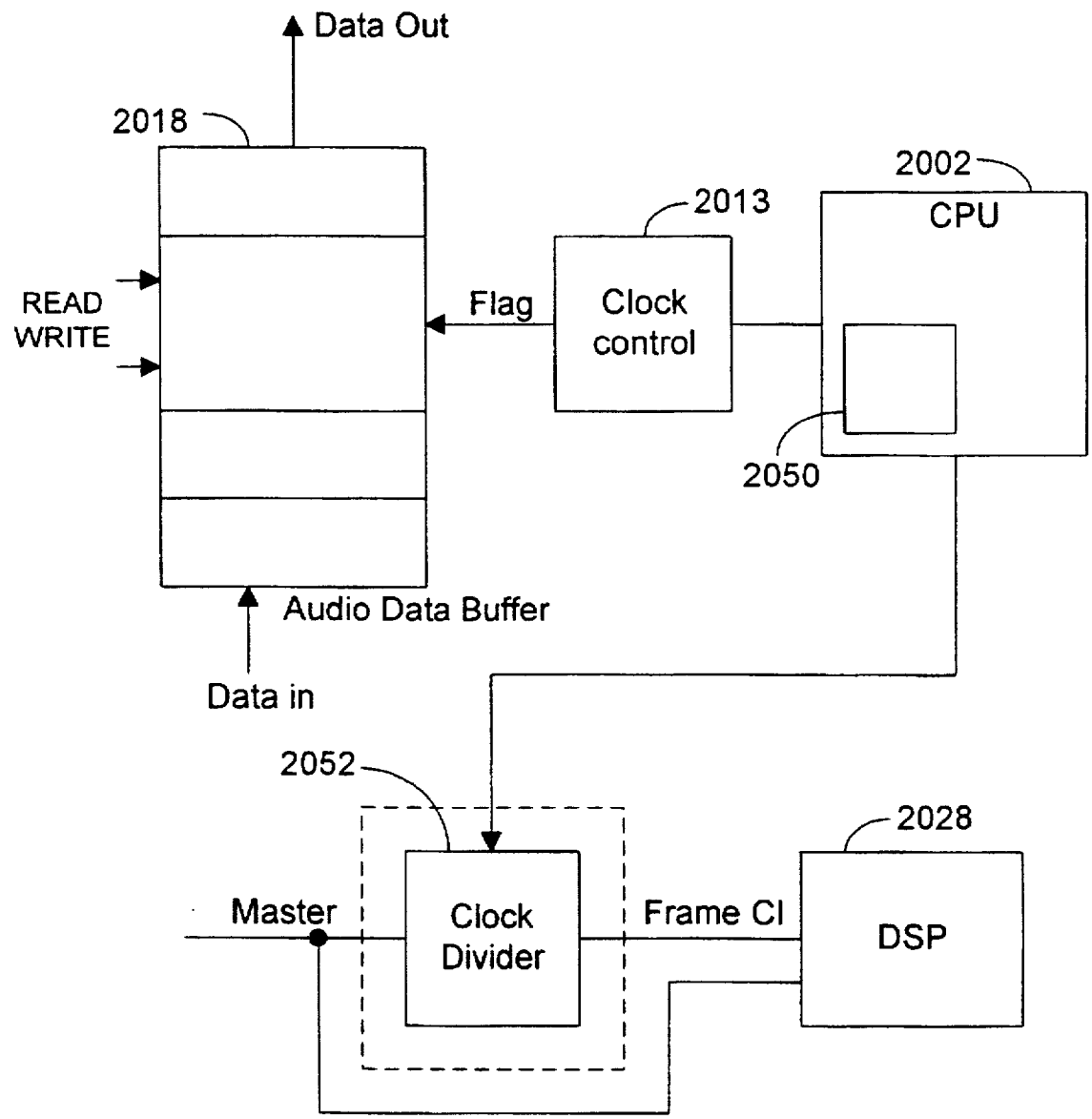
FIG. 5 is a block diagram of a mechanism used by the computer system of FIG. 5 to adjust the audio DSP's frame clock.

FIG. 5—Clock Synchronization Mechanism

Turning now to FIG. 5, there is shown in greater detail a diagram of a mechanism used to adjust the audio DSP frame clock. More particularly, the clock controller 2013 monitors the level of data in audio data buffer 2018. As discussed above, audio data buffer 2018 comprises one or more cascadable (either lengthwise or widthwise) dual-port FIFO RAM arrays, including a write address pointer and a read address pointer. Once data at a given address have been read, the address can be overwritten. The dual-port FIFO RAM arrays further include various control flags. Control flags may comprise a Full Flag, an Empty Flag, or a Threshold Flag (typically, Half Full). For example, if the FIFO buffer is full, the Full Flag goes active. Similarly, the Threshold Flag goes active if the number of words read out exceeds the number of words read in by a predetermined threshold (i.e., if WRITE ADDRESS - READ ADDRESS is greater than or equal to THRESHOLD). It is noted that where a plurality of arrays are employed, each Half Full flag may be used to detect whether the buffer is full in desired increments.

Clock controller 2013 monitors the level of data in the buffer 2018, for example, by monitoring the Threshold Flag of the dual port RAM array. For example, clock controller 2013 receives as an input the buffer 2018's Threshold Flag. When the amount of data in the buffer exceeds the threshold, the Threshold Flag goes active, which causes the clock controller 2013 to provide a corresponding signal to the CPU 2002. Software in the CPU 2002, in turn, adjusts upward or downward the increment by which programmable divider 2031 divides the DSP master clock.

It is noted that the level of data which may be monitored may be set arbitrarily at a predetermined desired level. For reasons of simplicity, the clock controller preferably monitors a single dual port RAM, coupled to receive its Half Full flag, i.e., the midpoint of memory data buffer 2018. Thus, if the amount of data in data buffer 2018 fills the buffer more than halfway, the audio DSP clock will be slowed down. If audio data buffer 2018 is not half full, software 2050 will speed up the audio DSP frame clock.

The audio DSP frame clock may be increased and decreased in arbitrary predetermined intervals. In a preferred embodiment, however, the Universal Serial Bus DAC clock and the DSP audio frame clock are accurate within 500 parts per million (ppm). Thus, the audio DSP frame clock can be adjusted or arranged at +/−1,000 ppm, or 44.1 samples per second. Since the buffer is in system memory and is relatively large, the clock is adjusted in fairly broad steps over 10 seconds. Thus, it is sufficient to provide an ability to adjust the clock up or down by 64 cycles per second in 8 cycle steps (+/−64 cycles of the 44.1 kHz clock). Thus, the software 2050 in CPU 2002 will adjust programmable clock divider 2052 to divide the master clock down depending on whether audio data buffer 2018 is full. It is noted that the increments by which the clock is adjusted, and the time period over which the adjustment occurs are chosen so as not to be noticeable to the listener. It is further noted that the clock controller 2013 monitors the Full Flag and the Empty Flag as well as the Half Full Flag, so as to interrupt the adjustment of the frame clock if the adjustment overcompensates.

EXAMPLE 1—Hardware-based Clock Synchronization

Operation of a clock synchronization mechanism according to an embodiment of the present invention is illustrated by the following example, using the following equations:

Frame clock=Master clock/Control

Control=Constant+Delta, where Constant is a predetermined value, and Delta is initially 0.

The DSP master clock operates at a predetermined frequency, for example 44.1 MHz. Clock divider 2052 divides the master clock by a predetermined Control value, for example 1000(Constant=1000, Delta=0), to arrive at a frame clock of 44.1 kHz. Thus, frame clock=44,100=44,100,000/(1000+0).

If the data are being read out of the buffer more slowly than they are being written into it (i.e., the CPU clock's 44.1 kHz is slower than the DSP's 44.1 kHz), the imbalance will eventually cause the Threshold Flag to go active. Assuming that the threshold is at half full, the Threshold Flag goes active when the write and read pointers are more than half-way apart. The clock controller 2013 detects the assertion of the Half Full Flag and, so long as the Half Full Flag is active, adjusts the programmable divider by increasing the Control divisor by Delta, thereby causing the frame clock to slow down. As noted above, the value for Delta is preferably chosen such that the frame clock is adjusted in 8 Hz increments. An initial decrement for the frame clock, then, is to 44,092 Hz. Recalling that frame clock=Master clock/(Constant+Delta), simple manipulation results in Delta= (Master Clock/Frame Clock)−Constant. Substituting in the appropriate values, Delta=(44,100,000/44,092)−1000=0.18. Thus, Control divisor is increased by 0.18 each iteration, so long as the Threshold Flag is active. Adjustment of the frame clock to speed it up is accomplished similarly.

Figure 6:
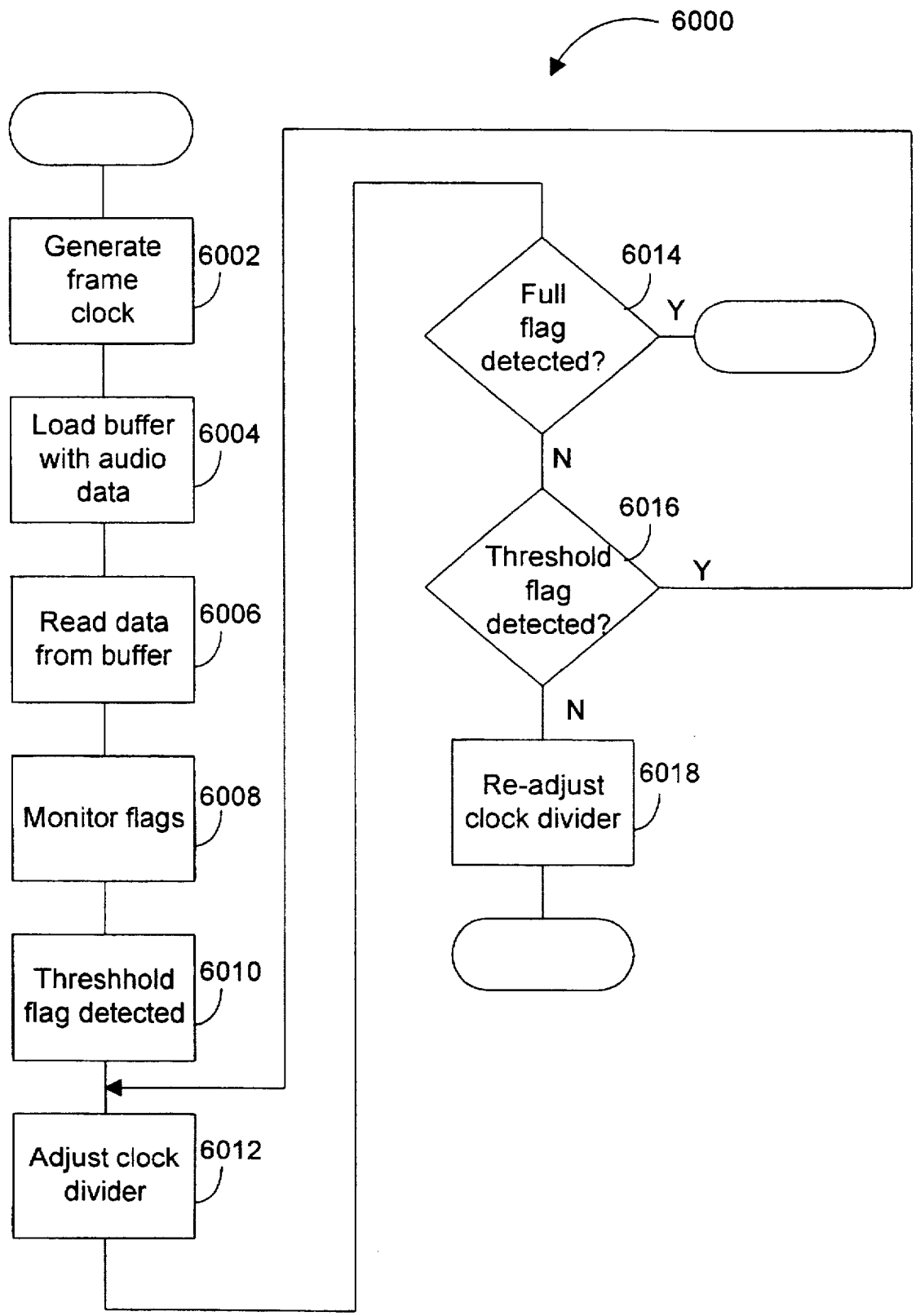
FIG. 6 is a flow diagram illustrating a method for adjusting a DSP frame clock.

FIG. 6—Flowchart of One Embodiment of Clock Synchronization

Turning now to FIG. 6, a flow diagram 6000 of a method for adjusting the frame clock used by the audio DSP is illustrated. More particularly, on system reset, the master clock is divided down to generate the frame clock (Step 6002). The audio DSP begins to generate audio data, which is loaded into the audio data buffer 2018 (Step 6004). The act of loading the audio data buffer causes the data to be read out of the audio data buffer (Step 6006). Clock control 2013 begins to monitor the audio data buffer's control flags (Step 6008). Thus, the clock controller monitors the Full Flag, the Empty Flag, and any Threshold Flags (for simplicity, it is assumed that there is only one threshold). Assuming the system is functioning properly, the first flag detected should be the Threshold Flag. If the Threshold Flag is detected (Step 6010), the clock controller provides a signal to the CPU which causes the clock divider to be adjusted such that the frame clock is adjusted downward in increments as discussed above (Step 6012). While this is occurring, the clock controller continues to monitor the control flags. If the Full Flag (Step 6014) is detected, the buffer will be reset because of the overflow condition. However, the increments by which the frame clock is divided should prevent this from occurring. Instead, if the Threshold Flag is still being detected, the incrementing should proceed as discussed above (Step 606). If the clock controller no longer detects the assertion of the Threshold Flag, the clock adjustment has been successful, and the buffer is less than half full. However, in the example discussed, only one Threshold Flag exists. Accordingly, the clock controller will detect the deassertion of the Threshold Flag as an indication that the frame clock is moving too slowly, and hence speed it up (Step 6018). The net effect of the clock adjustments is an equilibrium about the threshold level. It is noted that in alternate embodiments, a plurality of threshold flags are used, and equilibrium may be maintained within the bounds of two or more such thresholds.

EXAMPLE 2—Software-based Clock Synchronization

Operation of a clock synchronization mechanism according to a software implemented-embodiment of the invention is illustrated by the following example, using the following equations:

Frame clock=Master clock/Control

Control=Constant+Delta, where Constant is a predetermined value, and Delta is initially 0.

The DSP master clock operates at a predetermined frequency, for example 44.1 MHz. Clock divider 2052 divides the master clock by a predetermined Control value, for example 1000(Constant=1000, Delta=0), to arrive at a frame clock of 44.1 kHz. Thus, frame clock=44,100=44,100.000/(1000+0).

The data level in the buffer is periodically read by software running on the CPU responsive, for example, to an assertion of an interrupt. The levels of data are compared. If the data are being read out of the buffer more slowly than they are being written into it (i.e., the CPU clock's 44.1 kHz is slower than the DSP's 44.1 kHz), the difference between the levels of data will eventually cross a predetermined threshold. Assuming that the difference threshold is crossed, the software adjusts the programmable divider by increasing the Control divisor by Delta, thereby causing the frame clock to slow down. As noted above, the value for Delta is preferably chosen such that the frame clock is adjusted in 8 Hz increments. An initial decrement for the frame clock, then, is to 44,092 Hz. Recalling that frame clock=Master clock/(Constant+Delta), simple manipulation results in Delta=(Master Clock/Frame Clock)−Constant. Substituting in the appropriate values, Delta=(44,100,000/44,092)−1000=0.18. Thus, Control divisor is increased by 0.18 each iteration, so long as the difference threshold is greater than a predetermined number. Adjustment of the frame clock to speed it up is accomplished similarly.

Figure 7:
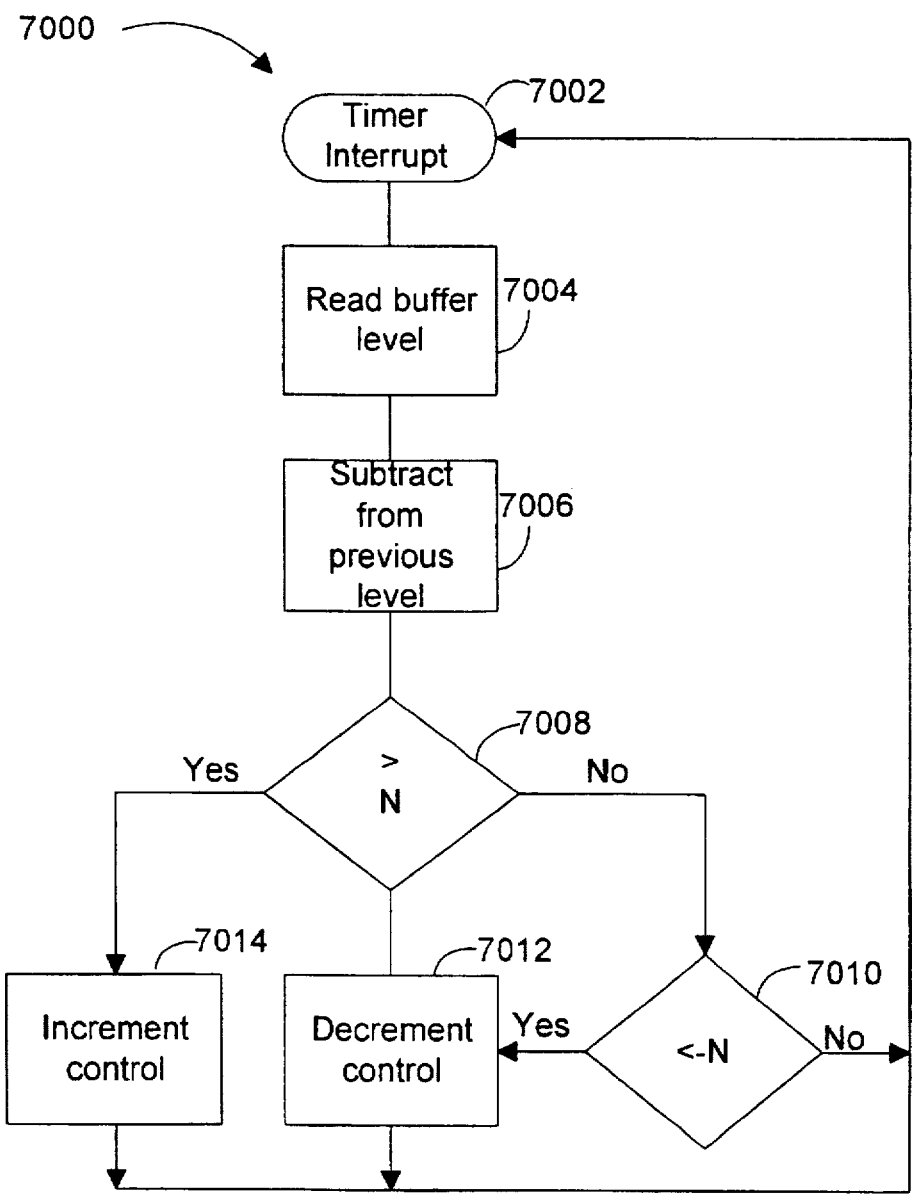
FIG. 7 is a flow diagram illustrating an alternate method for adjusting a DSP frame clock.

FIG. 7—Flowchart of Alternate Embodiment of Clock Synchronization

The embodiment of Example 2, employing software control for clock synchronization is now described. In such an implementation, a discrete FIFO dual port RAM is not employed. Rather, a portion of main memory configurable by software is employed in a FIFO fashion as a buffer for the data. Similarly, the functionality of clock controller 2013 is implemented in software.

Turning now to FIG. 7, a flowchart 7000 illustrating software control of clock synchronization is shown. A timer interrupt synchronized to the USB frame clock is periodically triggered (Step 7002). This preferably occurs in increments of from about 1 to about 10 seconds. A counter value N is defined, preferably a whole multiple of the interrupt timer period. The multiple may, for example, be 8; if the interrupt timer increment is 1 second, then N=8.

Upon triggering the interrupt, the software reads and records the current level of data in the buffer (Step 7004). In order to determine whether the level of data has increased or decreased, the current level of data in the buffer is subtracted from the previously stored and recorded level of data in the buffer (Step 7006). The difference is then compared to N. If the difference is greater than N (step 7008), the divider is incremented such that the clock speed is increased by a predetermined quantity (Step 7014). If the difference is not greater than N, then the difference is compared to negative N (Step 7010). If the difference is less than negative N, then the divider is decremented such that the clock speed is decreased by a predetermined quantity (Step 7012). The process then loops back to receive another interrupt.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a central processing unit (CPU);
   a data buffer operably coupled to said CPU, wherein said CPU is configured to read data from said data buffer at a first predetermined clock rate;
   a clock controller coupled to said data buffer and configured to monitor levels of data in said data buffer, and to provide a signal indicative of said levels of data to said CPU;
   a peripheral device operably coupled to said data buffer and including a data generating unit configured to generate said data and write said data to said data buffer at a second predetermined clock rate, wherein said peripheral device further includes:
      a master clock coupled to said data generating unit and configured to provide a computational clock for said data generating unit; and
      a programmable clock divider coupled to said master clock;
   wherein said second predetermined clock rate is generated by programming a value into said programmable clock divider and dividing said master clock by said value; and
   wherein said value is programmed by said CPU responsive to said clock controller determining that said levels of data in said data buffer cross a predetermined threshold, such that said second predetermined clock rate approximates said first predetermined clock rate.

2. The computer system of claim 1, wherein said data buffer comprises one or more dual port first-in/first-out (FIFO) random access memory (RAM) arrays.

3. The computer system of claim 2, wherein said one or more dual port FIFO RAM arrays includes a plurality of control flags.

4. The computer system of claim 3, wherein one of said control flags is a Threshold Flag, which is asserted when an amount of data in said data buffer exceeds a predetermined threshold.

5. The computer system of claim 4, wherein said clock controller is configured to detect an assertion of said Threshold Flag and provide an indication of said assertion to said CPU.

6. The computer system of claim 5, wherein said CPU is configured to adjust said value programmed into said programmable clock divider responsive to said clock controller detecting said assertion of said Threshold Flag.

7. The computer system of claim 6, wherein said CPU is configured to increase said value programmed into said programmable clock divider responsive to said clock controller detecting said assertion of said Threshold Flag.

8. The computer system of claim 6, wherein said CPU is configured to decrease said value programmed into said programmable clock divider responsive to said clock controller detecting said assertion of said Threshold Flag.

9. The computer system of claim 4, wherein said clock controller is configured to detect a deassertion of said Threshold Flag and provide an indication of said deassertion to said CPU.

10. The computer system of claim 9, wherein said CPU is configured to adjust said value programmed into said programmable clock divider responsive to said clock controller detecting said deassertion of said Threshold Flag.

11. The computer system of claim 10, wherein said CPU is configured to increase said value programmed into said programmable clock divider responsive to said clock controller detecting said deassertion of said Threshold Flag.

12. The computer system of claim 10, wherein said CPU is configured to decrease said value programmed into said programmable clock divider responsive to said clock controller detecting said deassertion of said Threshold Flag.

13. The computer system of claim 1, wherein said second predetermined clock rate is a frame clock rate.

14. A method for synchronizing clocks in a computer system, comprising:

generating data at a first predetermined clock rate, wherein said first predetermined clock rate is generated by dividing a master clock by a predetermined value;

providing said data to a data buffer;

reading said data from said data buffer at a second predetermined clock rate;

monitoring a level of data in said data buffer;

adjusting said first predetermined clock rate by adjusting said predetermined value responsive to determining that said level of data in said data buffer crosses a predetermined threshold, such that said first predetermined clock rate approaches said second predetermined clock rate.

15. The method of claim 14, wherein said monitoring comprises monitoring a Threshold Flag on one or more one or more dual port first-in/first-out (FIFO) random access memory (RAM) arrays.

16. The method of claim 15, wherein said adjusting said first predetermined clock rate includes providing an indication of an assertion of said Threshold Flag to a CPU.

17. The method of claim 15, wherein said adjusting said first predetermined clock rate includes providing an indication of a deassertion of said Threshold Flag to a CPU.

18. The method of claim 15, wherein said first predetermined clock rate is a frame clock rate.

19. A method for synchronizing clocks in a computer system, comprising:

generating data at a first predetermined clock rate, wherein said first predetermined clock rate is generated by dividing a master clock by a predetermined value;

providing said data to a data buffer;

reading said data from said data buffer at a second predetermined clock rate;

monitoring a first level of data in said data buffer at a first predetermined time;

monitoring a second level of data in said data buffer at a second predetermined time;

comparing said first level of data in said buffer with said second level of data in said buffer; and adjusting said first predetermined clock rate by adjusting said predetermined value responsive to determining that said second level of data in said data buffer is greater than or less than said first predetermined level of data in said buffer by a predetermined threshold, such that said first predetermined clock rate approaches said second predetermined clock rate.

20. The method of claim 19, wherein said first predetermined clock rate is a frame clock rate.

* * * * *

UNITED STATES PATENT AND TRADEMARK OFFICE
CERTIFICATE OF CORRECTION

PATENT NO. : 5,778,218
DATED : July 7, 1998
INVENTOR(S) : Dale E. Gulick

It is certified that error appears in the above-identified patent and that said Letters Patent is hereby corrected as shown below:

Claim 15, col. 12, line 9-10, please delete the duplicate instance of "one or more".

Signed and Sealed this

Twenty-fourth Day of November, 1998

Attest:

BRUCE LEHMAN

Attesting Officer

Commissioner of Patents and Trademarks